United States Patent
Maalioune et al.

(10) Patent No.: US 8,955,306 B2
(45) Date of Patent: Feb. 17, 2015

(54) METHOD FOR SYNCHRONIZING THE ACTUATORS OF A MOVABLE THRUST REVERSER COWL

(75) Inventors: Hakim Maalioune, Orgeval (FR); David Pereira, Limours (FR)

(73) Assignee: Aircelle, Gonfreville l'Orcher (FR)

( * ) Notice: Subject to any disclaimer, the term of this patent is extended or adjusted under 35 U.S.C. 154(b) by 1001 days.

(21) Appl. No.: 12/995,399

(22) PCT Filed: Apr. 27, 2009

(86) PCT No.: PCT/FR2009/050774
§ 371 (c)(1),
(2), (4) Date: Nov. 30, 2010

(87) PCT Pub. No.: WO2009/147333
PCT Pub. Date: Dec. 10, 2009

(65) Prior Publication Data
US 2011/0088369 A1    Apr. 21, 2011

(30) Foreign Application Priority Data
Jun. 6, 2008   (FR) ...................................... 08 03157

(51) Int. Cl.
*F02K 1/76*   (2006.01)
(52) U.S. Cl.
CPC .. *F02K 1/76* (2013.01); *F02K 1/763* (2013.01)
USPC ............. 60/226.2; 60/226.1; 60/770; 60/204; 73/112.01; 244/110 B; 239/265.19; 239/265.25; 239/265.27
(58) Field of Classification Search
CPC .................................. F02K 1/76; F02K 1/763
USPC ....... 60/226.1, 226.2, 226.3, 204; 244/110 B; 239/265.19, 265.25, 265.27, 265.29; 73/112.01
See application file for complete search history.

(56) References Cited

U.S. PATENT DOCUMENTS

| | | | |
|---|---|---|---|
| 6,109,021 A * | 8/2000 | Hanley et al. .................. 60/204 |
| 6,681,559 B2 * | 1/2004 | Johnson .......................... 60/204 |
| 6,684,623 B2 * | 2/2004 | Langston et al. ............. 60/226.2 |
| 6,771,032 B2 * | 8/2004 | Cox-Smith et al. ............. 318/85 |
| 6,926,234 B2 * | 8/2005 | Colotte et al. ............. 244/110 B |
| 7,278,257 B2 * | 10/2007 | Colotte et al. ............... 60/226.2 |
| 2002/0157376 A1 | 10/2002 | Ahrendt |
| 2005/0223691 A1 * | 10/2005 | Viswanathan .................. 60/204 |

FOREIGN PATENT DOCUMENTS

| DE | 60302529 | 8/2006 |
|---|---|---|
| EP | 0096880 | 12/1983 |

OTHER PUBLICATIONS

International Search Report; PCT/FR2009/050774; Sep. 28, 2009.

* cited by examiner

*Primary Examiner* — Phutthiwat Wongwian
*Assistant Examiner* — Steven Sutherland
(74) *Attorney, Agent, or Firm* — Brinks Gilson & Lione

(57) ABSTRACT

The invention relates to a method for controlling a plurality of actuators (9a, 9b, 9c) for a movable thrust reverser cowl (1), characterized remarkable in that the position deviation between adjacent actuators is measured in real time, and in that the speed profile of the actuator or actuators in question is adjusted by a position deviation exceeding a predetermined threshold.

8 Claims, 2 Drawing Sheets

METHOD FOR SYNCHRONIZING THE ACTUATORS OF A MOVABLE THRUST REVERSER COWL

TECHNICAL FIELD

The present invention concerns the field of thrust reversers for aircraft nacelles.

More particularly, the present invention concerns grid-type thrust reversers, including at least one cowl movable between a so-called "direct jet" position, corresponding to the normal flight situation, and a so-called "reversed jet" position, corresponding to the landing situation, making it possible to send part of the thrust from the engines towards the front of the aircraft, and thereby reduce braking distances.

BACKGROUND

Known from the prior art are electric means for actuating such a cowl between its two positions: these means can typically comprise ball screws rotatably moved by electric engines controlled by electronic supervising means.

Traditionally, a plurality of actuators is provided for each movable cowl (or each movable half-cowl, when the cowl is divided into two halves).

These electric actuators must be synchronized so as to avoid any subsequent butting or even locking of the movable cowl.

BRIEF SUMMARY

The present invention thus in particular aims to provide a control method for controlling these actuators making it possible to eliminate the risk of desynchronization of the actuators.

This aim of the invention is achieved with a control method for controlling a plurality of actuators of a movable thrust reverser cowl, remarkable in that the position deviation between adjacent actuators is measured in real time, and in that the speed profile of the actuator or actuators in question is adjusted by a position deviation exceeding a predetermined threshold.

Owing to this method, when an overly large position deviation is detected between adjacent actuators, it is possible to accelerate or slow the actuator(s) in question, so as to overcome the deviation and prevent the deformation and/or locking of the movable reverser cowl.

According to other optional features of the method according to the invention:

when it emerges from said measurement that one of the actuators is late in relation to the other actuators, the actuator in question is accelerated: this allows the late actuator to catch up with the other actuators;

when it emerges from said measurement that one of the actuators is late in relation to the other actuators, said other actuators are decelerated: this option, which makes it possible to align the other actuators on the late actuator, can be used either directly, or after the preceding option (acceleration of the late actuator) has failed, or simultaneously with the preceding option;

when it emerges from said measurement that one of the actuators is ahead in relation to the other actuators, the actuator in question is decelerated: this makes it possible to align the actuator that is ahead on the other actuators;

when it emerges from said measurement that one of the actuators is ahead in relation to the other actuators, said other actuators are accelerated: this option, which allows the other actuators to catch up with the actuator that is ahead, can be used either directly, or after the preceding option (deceleration of the actuator that is ahead) has failed, or simultaneously with the preceding option;

the other actuators are controlled by stepping: this stepping control of the other actuators, i.e. the actuators operating normally, makes it possible to reduce the risks of butting;

the stepping controls of the other actuators are staggered: this option makes it possible to impart torques to the movable cowl in different directions, which is useful in particular to get through a locking point of one of the cylinders;

the movable cowl is stopped if one of said actuators is locked or if the delay and/or advance of said actuator(s) in relation to the other actuators has not successfully been offset: this final step makes it possible to avoid the locking and/or deformation and/or breakage of the movable cowl.

BRIEF DESCRIPTION OF THE DRAWINGS

Other features and advantages of the present invention will appear in light of the following description and upon examination of the appended figures, in which.

DETAILED DESCRIPTION

In the following description, we will consider the specific case of a thrust reverser whereof the movable cowl extends over practically the entire circumference of the nacelle, and that is moved by three electric actuators.

Of course, the present invention is in no way limited to this particular example, and also applies to a movable cowl moved by two electric actuators or more than three electric actuators, as well as a movable cowl formed by two movable half-cowls, possibly able to move independently of each other.

Figure 1:
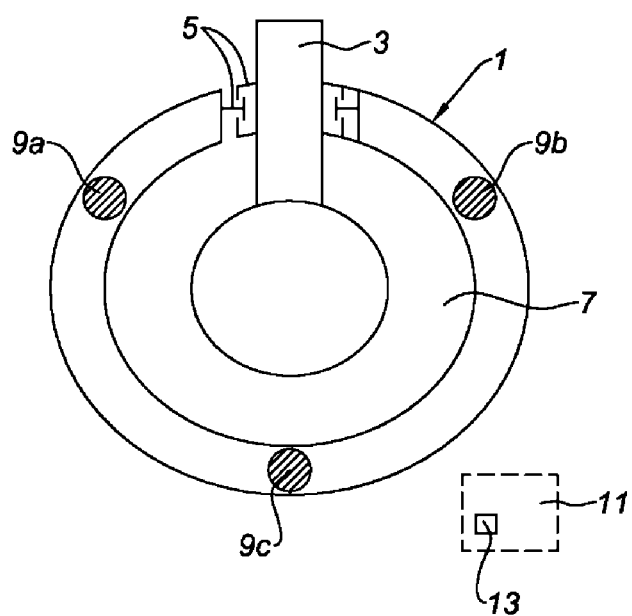
FIG. 1 is a transverse cross-sectional view of a thrust reverser to which the control method according to the invention is applied.

We therefore turn to FIG. 1, in which a movable thrust reverser cowl is diagrammatically illustrated, slidingly mounted on a pylon between a "direct jet" position and a "reversed jet" position.

The sliding of the movable cowl 1 on the pylon 3 is allowed by a rail and guideway system 5 known in itself, and makes it possible, during the landing phase, to divert at least part of the air flow circulating in the stream 7 towards the front of the nacelle equipped with said thrust reverser.

As explained in the preamble of the description, it is possible in this way to significantly reduce the braking distance of the aircraft upon landing.

The actuation of the movable cowl 1 between the "direct jet" and "reversed jet" directions is done using a plurality of electric actuators 9a, 9b, 9c, distributed substantially at 120° in the illustrated example.

As known in itself, these electric actuators can each typically comprise an electric engine engaged with a ball screw via a speed reduction mechanism.

These three electric actuators are controlled electronically by a supervisor 11 containing memory 13 in which speed profiles of these actuators are stored.

Speed profile refers to a speed curve 15 (see FIG. 3) of each actuator as a function of time.

Figure 3:
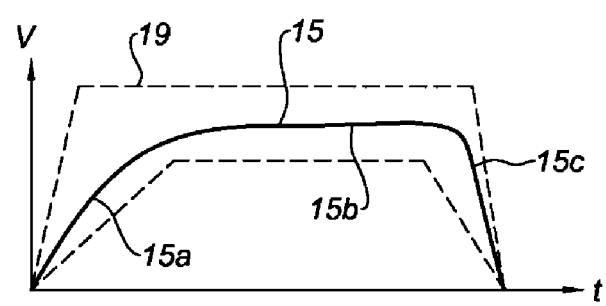
FIG. 3 shows the standard speed profile of each of these three actuators, as well as the variation envelope of this profile set out in the context of the present invention, FIG. 4 diagrammatically shows the position deviation thresholds between adjacent actuators of the movable cowl of the thrust reverser of FIG. 1, after which thresholds certain control actions are triggered, FIG. 5, similar to FIG. 2, illustrates the case where one of the three actuators of the movable cowl is late in relation to the other two actuators, FIG. 6, similar to FIG. 3, indicates the speed profile correction that is applied to the late actuator of FIG. 5, FIG. 7 indicates the speed profiles that can be applied to two sound actuators when the third has failed, or is locked, FIG. 8, similar to FIGS. 2 and 5, diagrammatically illustrates the case where one of the three actuators is ahead of the other two, FIG. 9, similar to FIGS. 3 and 6, indicates the adjustment made to the speed profile of the actuator that is ahead.

As shown in FIG. 3, this standard curve 15 traditionally comprises a first portion 15a for acceleration of the actuator, followed by a substantially constant speed plateau 15b, which in turn is followed by a rapid deceleration phase 15c.

For the operation of the thrust reverser to be optimal, it is important that the three actuators 9a, 9b, 9c be synchronized, i.e. that at each moment their positions be substantially identical.

Figure 2:
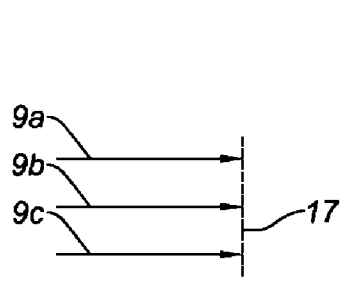
FIG. 2 is a diagrammatic view of three actuators of the movable cowl of said thrust reverser, when these three actuators are synchronized.

This is diagrammatically illustrated in FIG. 2, where the direction of movement and the positions of the three cylinders 9a, 9b, 9c are shown by three arrows: the alignment of the ends of these three arrows on the dotted line 17 indicates the perfect position synchronization of the three actuators.

At each moment, the supervisor 11 measures the position deviations existing between two adjacent actuators, i.e. in this case between: 9a and 9b, 9b and 9c, 9c and 9a.

Figure 4:
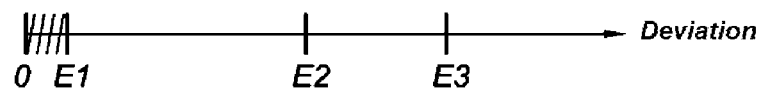

This position deviation between each pair of adjacent actuators is shown diagrammatically in FIG. 4: a first predetermined deviation value E1 is representative of measurement and processing imprecisions; a second deviation value E2 indicates the maximum tolerated position deviation between the pairs of adjacent actuators.

This maximum deviation is determined in particular from the permissible deviations of the various component parts of the thrust reverser.

When the position deviation of two adjacent actuators is greater than E2, a corrective action is triggered, which depends on the nature of the deviation, and will be described below.

When the position deviation between two adjacent actuators exceeds a third predetermined deviation value E3 greater than E2, the set of actuators is stopped, so as to avoid the deformation and/or breakage of certain parts of the thrust reverser.

The method according to the invention comprises essentially, when at least one of the deviations measured between the adjacent actuators is in the E2-E3 range, triggering a corrective action composed of adjusting the speed profile of the cylinder(s) displaying an anomaly and/or the cylinders operating normally.

This speed profile adjustment is shown diagrammatically by the dotted envelope 19 in FIG. 3.

As shown by this envelope, the adjustment of the speed profile can include in particular of a greater acceleration at the beginning of travel of the actuator (portion 15a of the curve), and/or an increase of the plateau speed (portion 15b of the curve) and/or a smaller deceleration at the end of actuating travel (portion 15c of the curve).

The general principles defined above will now be applied to different scenarios, provided as examples.

Figure 5:
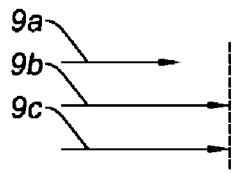

FIG. 5 shows the case where one of the actuators 9a is late in relation to the other two actuators 9b, 9c.

This delay can in particular be due to a failure of the concerned actuator, such a failure possibly being electric (loss of control of the actuator by the supervisor 11, electric engine failure) or mechanical (internal wear, increased friction, degradation of the ball bearings, temperature variations, differential expansion, etc.).

Figure 6:
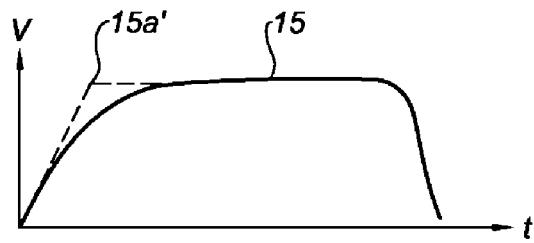

When the supervisor 11 detects the delay of the actuator 9a, it can for example control a greater acceleration of that actuator at the beginning of travel: this is shown diagrammatically by the dotted portion 15a' added to the standard speed profile curve 15 of FIG. 6.

Once the actuator 9a has rejoined the positions of the other two actuators 9b, 9c, the standard speed profile 15 is again applied to that actuator 9a.

If this correction is not sufficient, it can be considered, either simultaneously or subsequently, to correct the standard speed profiles of the other two actuators 9b, 9c, so as to slow those two actuators and calibrate them on the slower actuator 9a.

Figure 7:
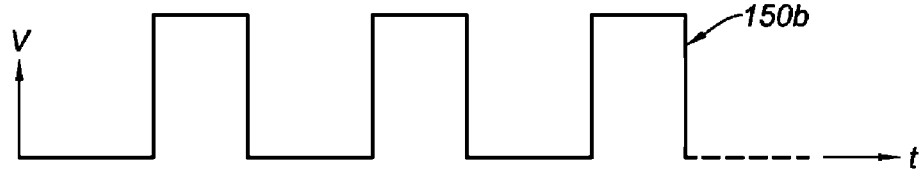
Figure 7:
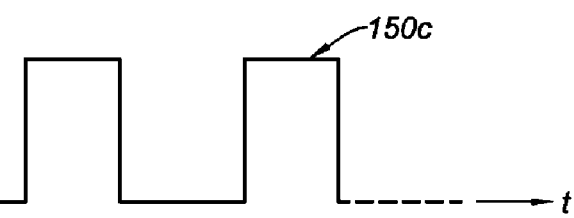

It should be noted that this slowing of the two actuators 9b and 9c can be done according to specific speed profiles 150b (applied to the actuator 9b) and 150c (applied to the actuator 9c), shown in FIG. 7.

As can be seen in that figure, these speed profiles are of the stepping (also called "pulsed") type.

This particular speed profiles are recommended in particular when the late actuator 9a is faced with a "hard point" (jamming).

It has in fact been observed that in that particular case, these speed profiles of the two sound actuators 9b, 9c make it possible to limit the butting risks of the movable cowl 1.

More particularly, and as shown in FIG. 7, it is possible to stagger the stepping speed profiles applied to the two sound actuators 9b, 9c by a duration d.

This temporal staggering d makes it possible to apply torques in different directions to the movable cowl 1, and thereby favor the unjamming of the actuator 9a.

Figure 8:
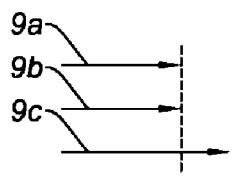

In the case shown in FIG. 8, one of the actuators 9c is ahead in relation to the other two actuators 9a, 9b.

Figure 9:
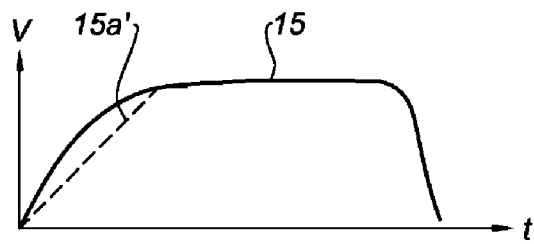

In this case, the supervisor 11 can in particular control a smaller acceleration of this actuator at the beginning of travel, as shown by the dotted line 15a' in FIG. 9.

If this correct is sufficient to synchronize the three actuators, then the supervisor 11 reapplies a standard speed profile to the actuator 9c.

If necessary, and simultaneously or subsequently, it is also possible to accelerate the two actuators 9a, 9b, such that they catch up with the actuator 9c that is ahead.

Once this catch-up is done, the standard speed curve is again applied to the two actuators 9a, 9b.

Figure 10:
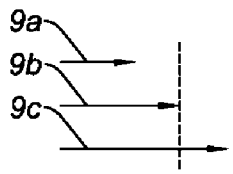
FIG. 10 shows the combined case where one of the actuators is late and another actuator is ahead in relation to the standard speed profile.

In the situation shown in FIG. 10, there is a late actuator 9a on one hand, and an actuator that is ahead 9c on the other.

In this particular case, the scenarios corresponding to FIGS. 5 and 8, described above, are combined, either simultaneously or subsequently.

More specifically, it is possible to start by accelerating the actuator 9a, then slowing the actuator 9c, then, if a deviation of the two actuators continues to exist in relation to a third, to slow or accelerate these two actuators depending on the situation observed.

As can therefore be understood in light of the preceding, the method according to the invention provides an extremely effective means for diagnosing position deviations between two pairs of adjacent actuators, and for real-time correction of those deviations.

This correction makes it possible to limit the risks of desynchronization between the different actuators, or to unlock one or several failed actuators, which makes it possible to limit the risks of locking, deformation, or even breakage of the movable cowl of the thrust reverser.

When the corrections of the speed profiles prove insufficient, i.e. when, despite these corrections, position deviations continue to grow between cylinders, to the point of crossing the threshold value E3, the entire system is stopped so as to avoid the deformation or even breakage of the movable thrust reverser cowl.

The method according to the invention is even more necessary given that the time for setting the movable cowl in motion is very fast and does not allow the system to have a quasi-natural equilibrium.

Of course, the present invention is in no way limited to the embodiment described and illustrated, and applies in particular to a movable thrust reverser cowl comprising two or more than three actuators, and possibly made up of two movable half-cowls.

The invention claimed is:

1. A control method for controlling a plurality of actuators of a movable thrust reverser cowl, wherein a position deviation between adjacent actuators is measured in real time, and a speed profile of at least one of the adjacent actuators is adjusted when the position deviation exceeds a predetermined threshold, wherein the speed profile defines an acceleration rate, a plateau speed, and a deceleration rate, and the adjustment of the adjacent actuators consists of increasing or decreasing the acceleration rate, increasing or decreasing the plateau speed, and increasing or decreasing the deceleration rate.

2. The method according to claim 1, wherein when it emerges from said measurement that one of the adjacent actuators is late in relation to the other actuators, the late actuator is accelerated.

3. The method according to claim 2, wherein the other actuators are controlled by stepping.

4. The method according to claim 3, wherein the stepping control of the other actuators are staggered.

5. The method according to claim 1, wherein when it emerges from said measurement that one of the adjacent actuators is late in relation to the other actuators, said other actuators are decelerated.

6. The method according to claim 1, wherein when it emerges from said measurement that one of the adjacent actuators is ahead in relation to the other actuators, the ahead actuator in question is decelerated.

7. The method according to claim 1, wherein when it emerges from said measurement that one the adjacent actuators is ahead in relation to the other actuators, said other actuators are accelerated.

8. The method according to claim 1, wherein the movable cowl is stopped if one of said adjacent actuators is locked or if the delay and/or advance of at least one of said adjacent actuators in relation to other actuators has not successfully been offset.

* * * * *